United States Patent
Becker (10) Patent No.: US 11,941,004 B1
(45) Date of Patent: Mar. 26, 2024

(54) SYSTEM AND METHOD FOR EXECUTING DATABASE OPERATIONS BASED ON A POLICY

(71) Applicant: United Services Automobile Association (USAA), San Antonio, TX (US)

(72) Inventor: Glen Alan Becker, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 32 days.

(21) Appl. No.: 17/035,036

(22) Filed: Sep. 28, 2020

(51) Int. Cl.
*G06F 16/2455* (2019.01)
*G06F 16/21* (2019.01)
*G06F 16/22* (2019.01)

(52) U.S. Cl.
CPC ...... *G06F 16/2455* (2019.01); *G06F 16/2228* (2019.01); *G06F 16/217* (2019.01)

(58) Field of Classification Search
CPC .. G06F 16/2455; G06F 16/2228; G06F 16/21; G06F 16/217
See application file for complete search history.

(56) References Cited

U.S. PATENT DOCUMENTS

| | | | | |
|---|---|---|---|---|
| 2009/0106196 | A1* | 4/2009 | Gutlapalli | G06F 16/2358 707/999.102 |
| 2015/0347401 | A1* | 12/2015 | Raghavan | G06F 16/214 707/809 |
| 2016/0162364 | A1* | 6/2016 | Mutha | G06F 3/0608 707/645 |
| 2017/0277747 | A1* | 9/2017 | Tremayne | H03M 7/60 |
| 2019/0286839 | A1* | 9/2019 | Mutha | G06F 16/29 |
| 2019/0294722 | A1* | 9/2019 | Mohan | G06F 16/27 |
| 2020/0320073 | A1* | 10/2020 | Horn | G06F 16/24542 |
| 2021/0271686 | A1* | 9/2021 | Abdul Rasheed | H04L 67/1097 |
| 2021/0374600 | A1* | 12/2021 | Wisniewski | G06F 16/254 |

\* cited by examiner

*Primary Examiner* — Alicia M Willoughby
(74) *Attorney, Agent, or Firm* — Fletcher Yoder, P.C.

(57) ABSTRACT

Disclosed are systems, devices, methods, and computer-readable media for performing various actions for bringing data stores into compliance with a policy. The actions include generating a global scan index ("scan index") for SAS® software and using the scan index to handle data management operations. Unlike traditional B-tree indices that consume a larger quantity of resources to parse through data, the scan indices may include a table of three columns. A first column may include an indication of a search value, a second column may include an indication of what table(s) in the data store(s) include the requested value, and a third column may include an indication of the row number for the tables in column two in which the value resides. The actions further include batching requests to perform a data management operation on data of a certain category by employing the scan index.

19 Claims, 5 Drawing Sheets

SYSTEM AND METHOD FOR EXECUTING DATABASE OPERATIONS BASED ON A POLICY

BACKGROUND

Advancements in technology have led to enterprises to store immense quantities of data (e.g., privacy information) from users (e.g., clients). Certain internal or external policies may define how certain information is to be maintained (e.g., deleted or modified) in order for the enterprise to comply with these internal or external policies. For example, external policies, such as certain local, state, or national regulations may request enterprises to remove certain user information and notify a user that their information has been deleted. As another example, internal policies, such as enterprise-wide policies indicating that stale data or outdated data should be deleted, may define guidelines for how an enterprise should monitor and update their data stores. In any case, taking actions to remain in compliance with these external or internal policies may require enterprises to parse through ever-increasing amounts of data, subsets of which may be unindexed, unorganized, and/or isolated from one another, and therefore making the data difficult to analyze. Existing techniques for parsing through the ever-increasing amounts of data may be cumbersome, computationally intensive, impractical to perform in view of available hardware and software resources, and isolated across the data stores of the enterprise.

Accordingly, there is a need to improve existing techniques for performing data management operations in a computationally efficient manner, for example, to comply with internal or external policies, the coordination of which may be difficult to implement in practice.

SUMMARY

Implementations of the present disclosure are directed to systems, devices, methods, and computer-readable media for performing various actions associated with data stores to place data in the data store into compliance with a policy. A computing device may receive computer-readable logic indicative of a policy defining how the enterprise is to maintain their data. The policy may include regulatory guidelines (e.g., national, state, or local regulations) indicating that certain types of information should be deleted, modified, and/or added for the data in the data store to be in compliance with the policy.

Certain data in the data store may be uncategorized, and implementations of the present disclosure include a technique for categorizing the data to determine a category associated with the data. Implementations of the present disclosure include determining that a string of alpha-numeric characters (e.g., text) is uncategorized and matching each word in the string to a corresponding entry in a scoring table defining a probability that a word belongs to one or more categories. Implementations of the present disclosure also examine numeric data, whether stored as character strings or in an internal binary format, to determine whether they include identifying information, such as account or customer numbers, telephone numbers, dates of birth, or Tax identification Numbers (TINs), which may also be known as Social Security Numbers (SSNs). Such numbers may take a wide variety of forms, which creates difficult challenges that implementations of the present disclosure overcome.

Additional implementations of the present disclosure are directed to systems, devices, methods, and computer-readable media for employing a global scan index (hereinafter "scan index") for software-based analysis programming, such as Statistical Analysis System (SAS®). Scan indices may become quite large, so implementations of the present disclosure include methods of partitioning the scan indices to permit them to be updated far more rapidly than a single-thread approach. Implementations of the present disclosure include a technique for handling database requests in software-based analysis programming by employing scan indices referenced as binary integers. Unlike traditional B-tree indices that consume a larger quantity of resources to store, scan indices stores only the information discussed below in a highly-compact format, without the overhead of internal navigation aids that can cause a B-tree index to be larger than the data it indexes. For example, the scan indices may include a table of three columns. A first column may include a search value, a second column may include an indication of what table(s) in the data store(s) include the requested value, and a third column may include an indication of the row number for the tables in column two in which the value resides. In some implementations, the first, second, and/or third column may be referenced by binary integers, making the scan indices computationally inexpensive as compared to traditional B-tree indices, as well as other indices.

Additional implementations of the present disclosure are directed to systems, devices, methods, and computer-readable media for batching data management operations to be performed on data of a certain category and employing the scan indices in software-based analysis programming to identify the data of the certain category. In some implementations, batching the requests may increase the speed of executing the data management operations by searching tables of the data store for the entries referenced by the batched data management operations, thereby accommodating multiple requests. In some embodiments, this batching capability may enable an organization to re-process historic requests that were processed incompletely, and thus avoid regulatory censure and improve the quality of the enterprise's response to privacy requests. Without this capability, organizations may be subject to fines and/or endure reputational loss. In this manner, the data of the certain category can be more quickly identified. This may increase enterprise productivity, improve compliance with internal and external policies, and enhance computational efficiency.

It is appreciated that methods in accordance with the present disclosure may include any combination of the aspects and features described herein. That is, methods in accordance with the present disclosure are not limited to the specific combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an exemplary embodiment," "some embodiments," or "an embodiment" of the present disclosure are not intended to be interpreted as excluding the existence of additional embodiments that also incorporate the recited features.

As may be appreciated, implementations of the present disclosure may be embodied as a system, method, device, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable medium(s) having computer-readable program code embodied thereon.

The present disclosure relates generally to systems and methods for providing robust data-privacy management based on a policy and based on a search for the entries. In particular, the present disclosure relates to systems and methods for employing word categorization techniques, global scan indices, and batched requests to perform a search for and remove certain data (e.g., the entries) from one or more data stores to comply with the policy.

While the following discussion is generally provided in the context of enterprise data-privacy management, it should be appreciated that the present techniques and embodiments disclosed are not limited to only these contexts. In fact, the implementation of the techniques of the present disclose may be useful in any implementation employing identification and modification of entries in a data store. Such implementations may include service planning techniques, manufacturing implementations, delivery systems, enterprise development, financial systems, and the like. As used herein, "users" may refer to clients (e.g., customers) of the enterprise and/or personnel employed by the enterprise, such as service agents. Certain software applications may be authorized for use by clients, while other software applications may be authorized for use by enterprise personnel (e.g., service agents). Furthermore, certain software applications may be authorized for use by at least both types of users (e.g., clients and enterprise personnel).

As used herein "enterprise" may refer to an organized venture in which services or products are provided to end-users, for example, to generate revenue. The enterprise may be divided into subunits (herein referred to as "departments"). In some contexts, clients may interact with the enterprise by way of "software applications." As used herein, the term "software application" or "application" refers to one or more computing modules, programs, processes, workloads, threads and/or sets of computing instructions executed by a computing device. Example embodiments of an application include software modules, software objects, software instances, and/or other types of executable code. Users (e.g., clients) may access applications provided by the enterprise. Users may provide the enterprise with certain information by engaging with the applications. Certain internal or external policies may define guidelines for deleting information to which the enterprise has access. As used herein, "policy" may refer to a set of external (e.g., local, state, or national) or internal (e.g., enterprise-wise, department wide, or technology group-wide) rules, regulations, and/or guidelines defining procedures for maintaining information. For example, the California Consumer Privacy Act is one example of a policy (e.g., external policy and state regulation) defining rules for how certain enterprises may handle personal data in one region of the world. In this example, users may act in accordance with the California Consumer Privacy Act to request enterprises to remove and delete user information. Implementations of the present disclosure facilitate handling these various requests. However, it should be understood that the present disclosure may be implemented in association with any other regulation in any region of the world. In another example, an enterprise may establish guidelines for removing outdated data to reduce storage and improve computation speed on the data. An enterprise may wish to locate sensitive and personal data to mitigate risk of data exposure or the risk of error from incorrect data.

In some implementations, users may provide an enterprise with personal information, such as name (e.g., first and last name), address (e.g., residence address), city, state, country, date of birth, contact phone number, and E-mail address, to name a few. With an ever-increasing number of users seeking to avail themselves of the services of enterprises, enterprises may receive and store a vast quantity of data. Certain internal or external policies or regulations may request that certain information be deleted, as discussed above, in order for the enterprise to comply with the internal or external policies or regulations. For example, external policies, such as certain local, state, or national regulations may define how enterprises should remove certain user information and/or notify a user that their information has been deleted. As another example, internal policies, such as enterprise-wide policies requesting that stale data or outdated data be deleted, may define guidelines and steps for how enterprises should monitor and update their data stores (e.g., databases). In any case, taking actions to remain in compliance with these external or internal policies may cause enterprises to parse through ever-increasing amounts of data, subsets of which may be isolated from one another, and therefore making the data difficult to analyze. Moreover, the recent emphasis on analytics and the wide variety of specialized analytical data stores often frustrate attempts to use conventional search tools to comply with data privacy requirements, especially because an enterprise may keep more data for analytics that it does for normal business processes. Existing techniques for parsing through the ever-increasing amounts of data are cumbersome, computationally intensive, and/or impractical to perform in view of available hardware and software resources.

Implementations of the present disclosure are directed to systems, devices, methods, and computer-readable media for performing various actions for bringing data stores into compliance with a policy. In some implementations, a computing device may perform the actions by executing artificial intelligence (AI) methodologies to perform aspects of the implementations disclosed herein. In some implementations, the computing device may receive a policy defining how the enterprise is to maintain their data. For example, the policy may indicate that certain types of information, such as that information belonging to one or more categories, should be deleted. However, not all information may be categorized. Accordingly, there is a need to develop a technique to quickly categorize and identify information. Implementations of the present disclosure include a technique for determining that a string of alpha-numeric characters (e.g., text) is uncategorized and matching each word or each uncategorized word in the string to a corresponding entry in a scoring table defining a probability that a word belongs to one or more categories. Implementations of the present disclosure include aggregating the probabilities for each word or each uncategorized word in the string to determine a category of the string. In this manner, unidentified and uncategorized data may be categorized to facilitate maintenance of data in and across large data stores.

Additional implementations of the present disclosure are directed to systems, devices, methods, and computer-readable media for generating a global scan index (hereinafter referred to as "scan index") for Statistical Analysis System (SAS®) software. A Native SAS® index may serve only one table, and an index that could locate data to serve a privacy request indexes only one column of that table. Such an index is often larger than the data it indexes. For example, an index of a single, 8-byte column is stored in an average of 22 bytes per row, nearly three times the size of the data to which it refers. Using such indices to comply with data privacy policies may require a separate index search for each searchable column of each table, which may be impractical in a common installation of more than a million tables that each have an average of six searchable columns, like Name, Address, E-mail, and so forth. As discussed below, a single scan index contains all references to all tables for a given column type. For example, privacy requests may use E-mail address to identify a person. In some implementations, a single, fast search of the scan Email index identifies all tables having a particular E-mail address, and identifies which rows in those tables have that E-mail address. Thus, a single operation yields the same results as thousands (or even millions) of conventional index searches, considering that a conventional strategy must do a separate search for each column of each table that might have an email address. Scan indices have an additional benefit over conventional indexes in that they may make each index entry much smaller than a conventional index. For example, a conventional SAS® index that indexes a date of birth (DOB) column may require the same 22 bytes per row just to index all DOBs in a single table. In contrast, an embodiment of a scan date index may store each entry in 10 bytes and may uniquely locate any date from 1871 to 2138 in any of 16 million tables, each of which can have more than a trillion rows.

Accordingly, existing indices for SAS® software are large and include expensive computation, thereby making the indices inefficient for identifying specific rows. Accordingly, there is a need to improve data management operations within SAS® software. Implementations of the present disclosure include a technique for handling database requests in SAS® software by employing global scan indices (i.e., "scan indices") that may be referenced as binary integers. Unlike traditional B-tree indices that consume a larger quantity of resources to parse through data, the scan indices may include a table of three columns. A first column may include an indication of a search value, a second column may include an indication of what table(s) in the data store(s) include the requested value, and a third column may include an indication of the row number for the tables in column two in which the value resides. In some implementations, the first, second, and/or third column may be referenced by binary integers, making the scan indices computationally inexpensive as compared to traditional B-tree indices, for example. In embodiments where many tables are in formats that do not support direct indexing by row number, batching offers better performance than traditional search techniques that typically read all rows of each table for each request.

Additional implementations of the present disclosure are directed to systems, devices, methods, and computer-readable media for batching requests to perform a certain data management operation on data of a certain category and employing the scan indices in SAS® software to identify the data of the certain category. In certain implementations, scan indices determine which candidate tables and rows may contain requested data, such that the underlying tables are read once to perform additional verification not possible with the index. In some implementations, batching the requests may enhance the efficiency of executing the certain computational operations by searching the existing tables at the same time to accommodate multiple requests. In this manner, the relevant tables are searched to accommodate multiple requests, and the data of the certain category can be more quickly identified, thereby increasing enterprise productivity, improving compliance with policies, and enhancing computational efficiency.

For example, a policy, such as the California Consumer Privacy Act (CCPA), may apply to a subset of data associated with certain users (e.g., client). Data maintained using SAS® software may include non-consumer personal identification information (hereinafter "PII"), such as names, addresses, phone numbers, and E-mail addresses of employees and outside entities such as claim adjustors, realtors, real estate appraisers, body shops, car dealers, lawyers, and so forth. In some implementations, data management operations may benefit from distinguishing consumer PII from non-consumer PII. Implementations of the present disclosure may include excluding employee and department names, which in certain tables may include duplicate entries. For example, if a table of claims closed by a department of ten people has 1000 rows, then a column of employee names may have 1% unique values. In this example, may benefit from distinguishing consumer from non-consumer PII to prevent false positives (e.g., a match that should not be a match responsive to a query). Implementations of the present disclosure include identifying common classes of false positives, such as non-consumer PII and notifying target personnel (e.g., table and library owners part of sensitive data management (SDM) groups) of false positive detections, and support a table of false positives. Implementations of the present disclosure include maintaining records of which entries in the false positive table are not used to exclude any similar findings in tables of the data store, so that stale entries can be periodically removed.

Aspects of the present disclosure are described below with reference to flowchart illustrations and/or block diagrams of methods, apparatuses, systems, and/or computer program products according to implementations of the present disclosure. It should be understood that each block of the flowchart illustrations and/or block diagrams, and combinations of blocks in the flowchart illustrations and/or block diagrams, may be implemented by computer program instructions. These computer program instructions may be provided to processing circuitry of a general purpose computer, special purpose computer, or other programmable data processing apparatus to produce a machine, such that the instructions, which execute via a processor of the computer or other programmable data processing apparatus, implement the functions/acts specified in the flowchart and/or block diagram block or blocks.

Computing System

Figure 1:
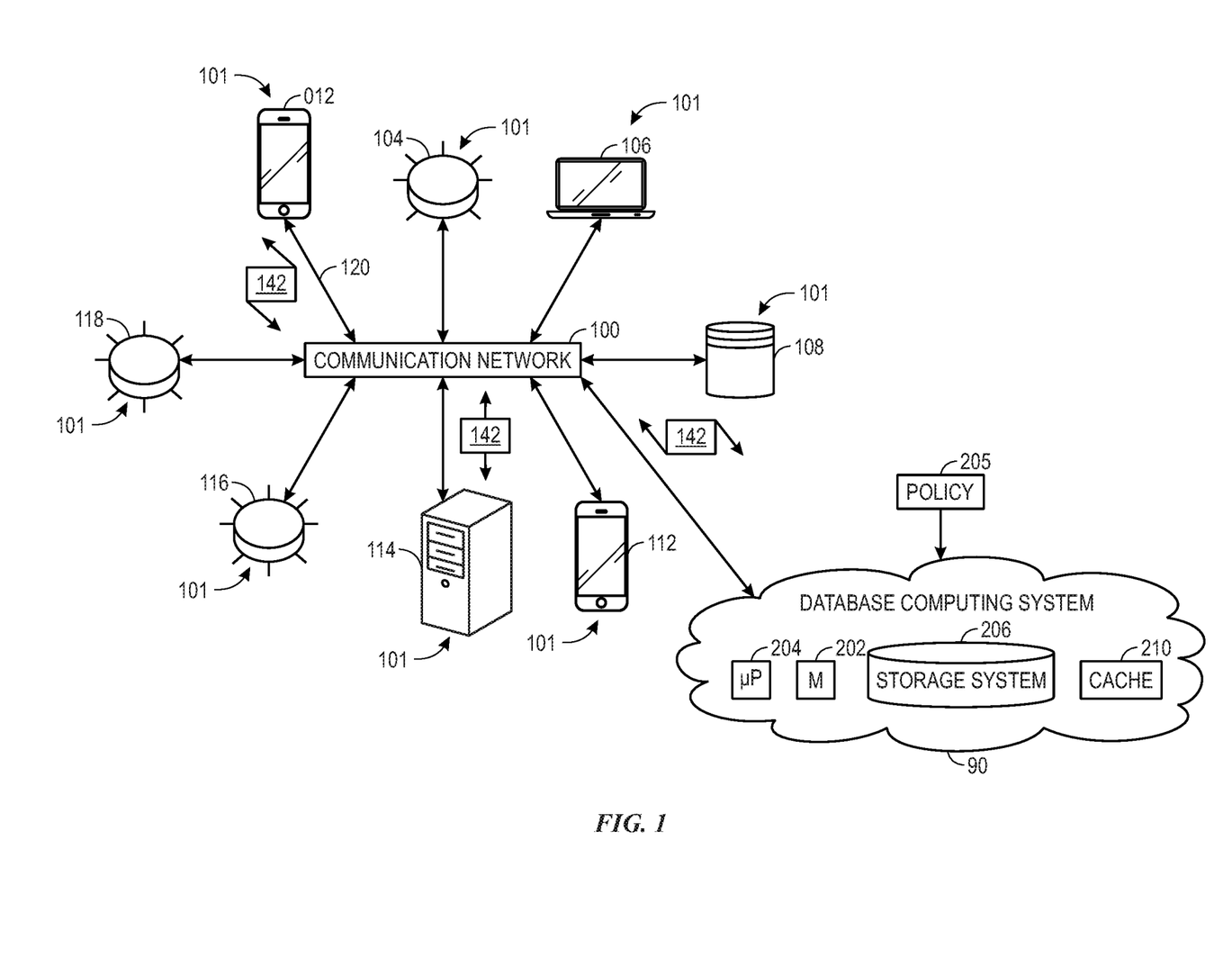
FIG. 1 is a schematic diagram of a computing system communicatively coupled to user devices via a communication network, according to implementations of the present disclosure.

By way of introduction, FIG. 1 is a schematic diagram of an exemplary computing system 90 communicatively coupled to user devices via a communication network 100, according to implementations of the present disclosure. The communication network 100 may include a geographically distributed collection of nodes interconnected by communication links and segments for transporting data between end nodes, such as personal computers, work stations, smart phone devices, tablets, televisions, gaming/media consoles, smart watches, smart wristbands, sensors, automobiles, and the like. Exemplary types of networks include local area networks (LANs), wide area networks (WANs), and so forth. LANs may connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), synchronous digital hierarchy (SDH) links, or Powerline Communications (PLC), and others.

The nodes/devices 101 (e.g., smart phone devices 102, sensors 104, client computing devices 106, databases 108, smart phone devices 112, web servers 114, routers 116, switches 118, and the like) of the communication network 100 may be interconnected by various methods of communication. For instance, links 120 may be wired links or may include a wireless communication medium that communicatively couple nodes with other nodes (e.g., based on distance, signal strength, current operational status, and/or location). Moreover, the devices 101 may communicate data packets (or frames) 142 with other devices 101 using predefined network communication protocols, such as various wired protocols, wireless protocols, and so forth. In this context, a protocol may include a set of rules defining how the nodes interact with each other. Any number of nodes, devices, links, and so forth, may be used in the computer network, and the view shown in FIG. 1 is for simplicity. Also, while the embodiments are shown herein with reference to a general network cloud, the description herein is not so limited, and may be applied to networks that are, at least in part, hardwired.

The computing system 90 may similarly be interconnected to the nodes/devices 101 via the communication network 100 by various methods of communication, as discussed above. The computing system 90 may include a memory device 202 storing instructions to be executed by processing circuitry 204. In some implementations, the memory device 202 may include computer-readable medium(s). The computing system 90 may receive a policy 205 defining how the computing system 90 is to maintain the data received from nodes/devices 101. In certain implementations, the policy 205 may include a set of rules provided as code or instructions stored in the memory device 202 and interpretable by processing circuitry 204 to cause the processing circuitry 204 to maintain (e.g., add, modify, delete) data received from the nodes/devices 101. The computing system 90 may store the data received from the nodes/devices 101 in a storage system 206 or a cache 210. The computing system 90 may push notifications to certain nodes/devices of the nodes/devices 101. In this manner, the computing system 90 may provide various services and information to the nodes/devices 101. In some implementations, the services and information may be specific to a particular node/device (e.g., sensors 104) of the nodes/devices 101.

Any combination of one or more computer-readable medium(s) may be utilized. The computer-readable medium may be a computer-readable signal medium or a computer-readable storage medium. A computer-readable storage medium may be, for example, an electronic, magnetic, optical, electromagnetic, infrared, or semiconductor system, apparatus, or device, or any suitable combination of the foregoing. Additional examples of the computer readable storage medium may include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may include any tangible medium that may include or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, such as electromagnetic, optical, or any suitable combination thereof. A computer-readable signal medium may include any computer-readable medium that is not a computer-readable storage medium and that may communicate, propagate, or transport a program for use by or in connection with an instruction execution system, apparatus, or device. Program code embodied on a computer-readable medium may be transmitted using any appropriate medium, including but not limited to wireless, wireline, optical fiber cable, radio frequency (RF), and the like, or any combination thereof.

Computer program code for carrying out operations for aspects of the present disclosure may be written in any combination of one or more programming languages, including an object-oriented programming language such as Java, Smalltalk, C++, or the like, and conventional procedural programming languages, such as the C programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer, for example, through the Internet using an Internet Service Provider.

These computer program instructions may also be stored in a computer-readable medium that may direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flowchart and/or block diagram block or blocks.

Figure 2:
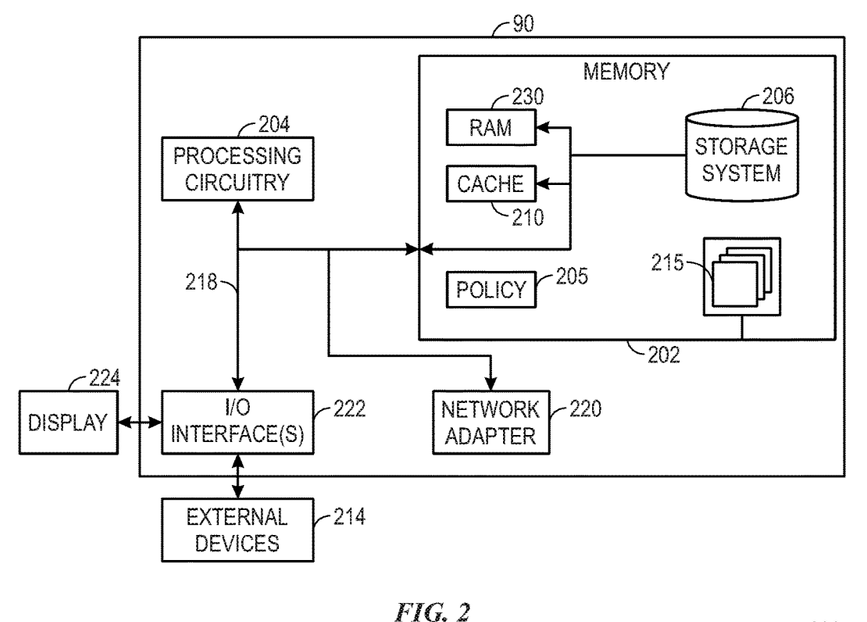
FIG. 2 is a block diagram of the computing system of FIG. 1, according to implementations of the present disclosure.

For example, and as discussed in more detail with respect to FIG. 2, the processing circuitry 204 may process instructions stored in the memory device 202 (e.g., computer-readable signal medium) and/or use data on the storage system 206 to practice the implementations described herein. The processing circuitry 204 may include any suitable processing elements, circuitry, and/or logic, such as single-threaded processor(s), multi-threaded processor(s), hardware-based processors (each including one or more cores), general purpose processor(s), special purpose processor(s), and/or the like.

The processing circuitry 204 may implement machine learning methodologies. In general, machine learning relates to the ability of computing devices to learn from and make predictions based on data. In practice, machine learning may include a process of providing a machine learning algorithm with training data to learn from, so as to create a machine learning model by a training process. Specifically, the machine learning model may find pattern(s) in the training data that map to a target variable (e.g., the answer that a user wants predicted) and may output predictions in accordance with these pattern(s). After a machine learning model is trained to predict target variables, machine learning may then involve using that machine learning model to generate machine learning prediction(s) on new data for which the target variable is not yet known. In this manner, the processing circuitry 204 may implement the embodiments disclosed herein using machine learning methodologies to train models to iteratively make target predictions to index a string of alphanumeric characters using the scan index, as discuss with respect to FIG. 3, and performing batched data management operations as discussed with respect to FIG. 6.

FIG. 2 is a block diagram of an example of the computing system 90 of FIG. 1, according to implementations of the present disclosure. The computing system 90 (or components thereof) may be used with one or more embodiments described herein (e.g., as one of the nodes 101 shown in the communication network 100). As explained above, in different embodiments the various devices communicate with the computing system 90 (and/or with one another) in any suitable way, such as, for example, via the communication network 100. The computing system 90 represents any type of computer device capable of carrying out the teachings of various embodiments of the present disclosure. The computing system 90 is one example of a suitable system and is not intended to suggest any limitation as to the scope of use or functionality of embodiments of the present disclosure described herein. Regardless, the computing system 90 may implement and/or perform any of the functionality set forth herein.

The computing system 90 may be operational with numerous other general-purpose or special-purpose computing system environments or configurations. Example computing systems, environments, and/or configurations that may be suitable for use with the computing system 90 include, but are not limited to, micro-controllers, personal computer systems, server computer systems, thin clients, thick clients, hand-held or laptop devices, multiprocessor systems, microprocessor-based systems, set top boxes, programmable consumer electronics, network PCs, minicomputer systems, distributed data processing environments that include any of the above systems or devices, and the like.

The computing system 90 may be described in the general context of computer system-executable instructions, such as program modules, being executed by a computer system. Generally, program modules may include routines, programs, objects, components, logic, data structures, and so on that perform particular tasks or implement particular abstract data types. The computing system 90 may be practiced in distributed data processing environments where tasks are performed by remote processing devices that are linked through a communications network. In a distributed data processing environment, program modules may be located in both local and remote computer system storage media including memory storage devices.

The computing system 90 is shown in FIG. 2 in the form of a general-purpose computing device. The components of the computing system 90 may include, but are not limited to, one or more processors or processing circuitry 204, a memory device 202, and a bus 218 (e.g., bus bar), coupling various system components including the memory device 202 to the processing circuitry 204.

The bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computing system 90 typically includes a variety of computer system-readable media. Such media may be any available media that is accessible by the computing system 90, and may include both volatile and non-volatile media, removable and non-removable media. For example, the memory device 202 may include computer system-readable media in the form of volatile memory, such as random-access memory (RAM) 230 and/or cache memory 210. The computing system 90 may further include other removable/non-removable, volatile/non-volatile computer system storage media. By way of example, a storage system 206 may be provided for reading from and writing to a non-removable, non-volatile magnetic media (not shown and typically called a "hard drive") and from remote located database (e.g., "cloud" based storage devices). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other media (e.g., a USB storage device) may be employed. In such implementations, each may be connected to the bus 218 by one or more data media interfaces. As will be further depicted and described below, the memory 202 may include at least one program product having a set (e.g., at least one) of program modules that are configured to carry out the functions of embodiments of the disclosure.

Program modules 215, such as underwriting module, may be stored in the memory 202. In some implementations, the program module 215 may be associated with an operating system, one or more application programs, other program modules, and program data. The program modules 215 generally carry out the functions and/or methodologies of embodiments of the disclosure as described herein. The program modules 215 may be provided or licensed to the nodes/devices 101 of FIG. 1 to provide them with certain information and services. The computing system 90 may receive the policy 205 of FIG. 1 (e.g., from a policy provider) and/or certain user data (e.g., from the nodes/devices 101 of FIG. 1).

The computing system 90 may also communicate with one or more external devices 214 (either via a wired connection or wireless), such as a keyboard, smart phone device, a pointing device, a display 224, and so forth; one or more devices that enable a user to interact with the computing system 90; and/or any devices (e.g., network card, modem, etc.) that enable the computing system 90 to communicate with one or more other computing devices. Such communication may occur via Input/Output (I/O) interfaces 222. The computing system 90 may communicate with one or more networks such as a local area network (LAN), a general wide area network (WAN), and/or a public network (e.g., the Internet) via a network adapter 220. As depicted, the network adapter 220 communicates with the other components of the computing system 90 via the bus 218. It should be understood that, although not shown, other hardware and/or software components could be used in conjunction with the computing system 90. Examples include, but are not limited to microcode, device drivers, redundant processing units, external disk drive arrays, RAID systems, tape drives, data archival storage systems, and so forth.

FIGS. 1 and 2 are intended to provide a brief, general description of an illustrative and/or suitable exemplary environment in which embodiments of the present disclosure may be implemented. FIGS. 1 and 2 are exemplary of a suitable environment and are not intended to suggest any limitation as to the structure, scope of use, or functionality of an embodiment of the present disclosure. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be added.

Figure 3:
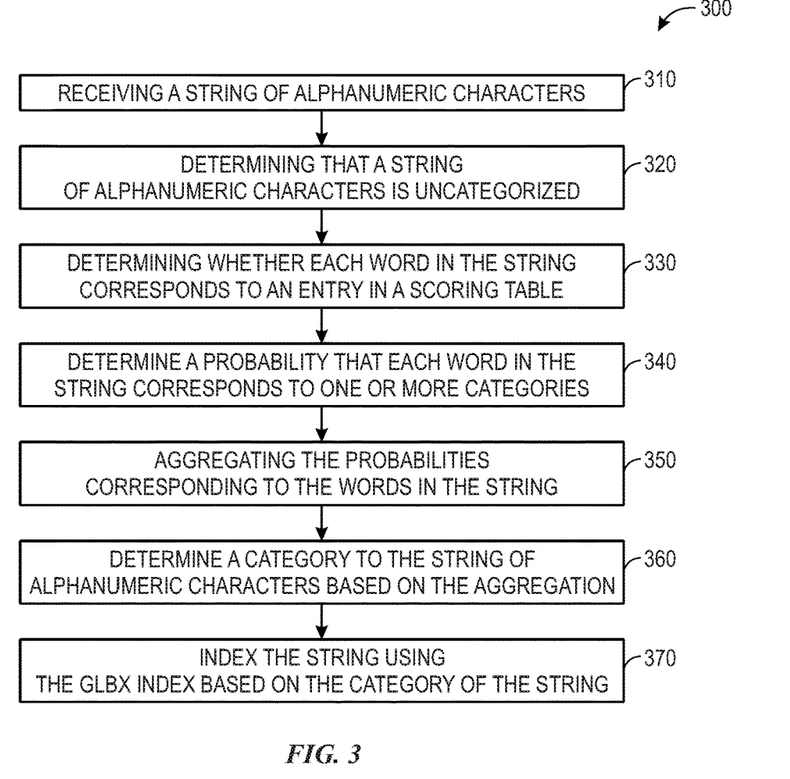
FIG. 3 is a flow diagram of a process for determining a category for a string of alpha-numeric characters, according to implementations of the present disclosure.

Employing Computing System to Determine a Category Associated with Uncategorized Text With the exemplary communication network 100 (as illustrated in FIG. 1) and computing system 90 (as illustrated in FIG. 2) in mind, description of certain illustrated embodiments of the present disclosure will now be provided. With reference now to FIG. 3, FIG. 3 is a flow diagram of a process 300 for determining a category for a string of alpha-numeric characters (e.g., text), according to implementations of the present disclosure. The process 300 may be performed by the computing system 90 of FIG. 1. For example, the process 300 may be implemented in the form of a software application that includes instructions executed by suitable processing circuitry of the computing system 90, such as the processing circuitry 204. At least some of the steps of the process 300 may be executed by employing AI and/or machine learning methodologies. The illustrated process 300 is provided as an example, and in other embodiments, certain illustrated steps of the process 300 may be performed in other orders, skipped, or repeated, in accordance with the present disclosure.

Process 300 may include receiving (process block 310) a string of alphanumeric characters. As used herein, a "string of alphanumeric characters" or "string" may refer to a string of text, symbols, or spaces. In certain implementations, the string of alphanumeric characters may include one or more words. As used herein, a "word" may refer to text or symbols that are joined together. For example, words may be separated by spaces and/or hyphens with respect to one another. In certain implementations, the computing system 90 (FIGS. 1 and 2) may receive large quantities of data from devices 101 (FIG. 1). As discussed above, a subset of the data may not be categorized or indexed such that a type associated with the information is unidentifiable. The string of alphanumeric characters may include freeform text not having been assigned to a specific category or index. The process 300 may include determining (process block 320) that the string of alphanumeric characters is uncategorized. In some implementations, categories may include first name, last name, street address, city, country, zip code, and so forth. For example, an uncategorized string of alphanumeric characters may refer to a string of text not belonging to any of these categories and/or not being indexed so as to correspond to these categories.

Process 300 may include determining (process block 330) whether each word in the string corresponds to an entry in a scoring table. In response to determining (process block 330) whether each word in the string corresponds to an entry in a scoring table, the computing system 90 may determine (process block 340) a probability of each word in the string corresponds to one or more categories. A scoring table may include a plurality of words, each having a probability indication that the corresponding word belongs to one or more categories, as discussed below with respect to FIG. 4. In some implementations, the scoring table may be stored in the memory 202 (FIGS. 1 and 2) or storage system 206 (FIGS. 1 and 2), and include any suitable number of words with corresponding probabilities that the word belongs to a particular category (e.g., first name, last name, street address, city, country, zip code, and so forth). For example, the word "STEVE" may be stored in the scoring table, and have a probability of belonging to a first name of 70%, a probability of belonging to a last name of 5%, a probability of belonging to a street address of 8%, a probability of belonging to a city of 1%, a probability of belonging to a zip code of 0%, a probability of belonging to a country of 0%, and so forth. In certain implementations, indexing and searching may or may not be case-sensitive. A user having access to the computing system 90 may modify the scoring table to include, remove or modify words, and/or to include, modify, or remove the categories and their corresponding percentages. In response to determining (process block 330) that a particular word in the string does not corresponds to an entry in a scoring table, the particular word may be omitted in determining the category of the word and/or an indication of the particular word may be sent to certain personnel for manual categorization. In certain implementations, machine learning implementations may be employed to modify the scoring table.

After determining (process block 340) the probability of each word in a string of alphanumeric characters, the process 300 includes aggregating (process block 350) the probabilities for each of the words in a string of alphanumeric characters. The process 300 includes determining (process block 360) a category for the string of alphanumeric characters based on the aggregation (process block 350). In certain implementations, determining (process block 360) a category for the string of alphanumeric characters may include determining whether the string of alphanumeric characters corresponds to a particular category (e.g., first name, last name, street address, city, country, zip code, and so forth). In certain implementations, the computing system 90 may determine whether the string includes personally identifiable information (PII), such as first name and last name. Indeed, the computing system 90 may determine and/or assign (process block 360) a first category to the string. The first category may be indicative of whether the string corresponds to first name, last name, street address, city, country, zip code, and so forth. Additionally or alternatively, the computing system 90 may determine and assign (process block 360) a second category to the string. The second category may be indicative of whether the string corresponds to PII (e.g., first name and last name). The process 300 may include indexing (process block 370) the string using the scan index, discussed below, based on the category of the string. In this manner, otherwise unidentified entries (e.g., string of alphanumeric characters) in a database may be identified based on the category to which they belong. In some implementations, process 300 may facilitate categorization and identification of otherwise unidentified and unindexed entries in one or more tables, for example, maintained in accordance with SAS® software.

Figure 4:
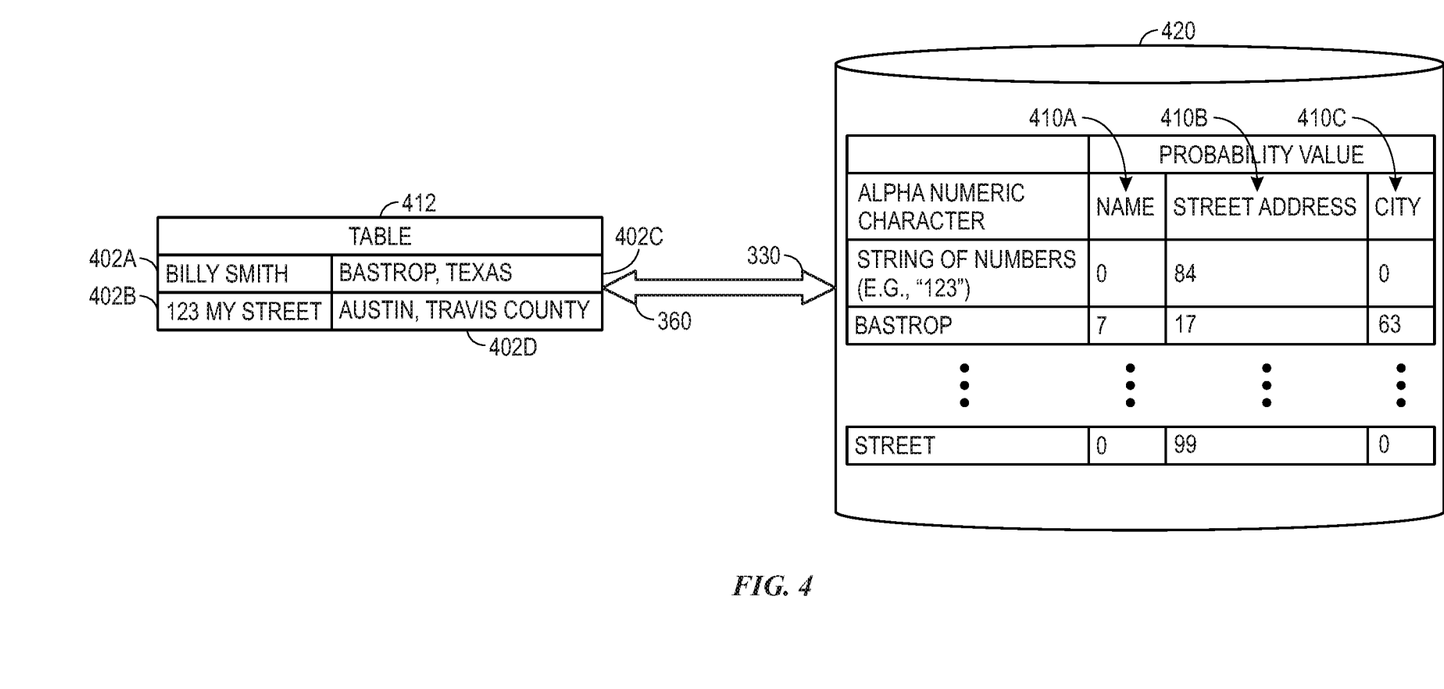
FIG. 4 is a schematic diagram of uncategorized entries assigned a category based on the process of FIG. 3, according to implementations of the present disclosure.

FIG. 4 is a schematic diagram 400 of uncategorized entries 402 assigned a category 410 based on the process 300 of FIG. 3, according to implementations of the present disclosure. In the illustrated embodiment, table 412 includes four entries 402 (i.e., 402A, 402B, 402C, and 402D), each having a string of text. The computing system 90 may receive (process block 310) the table 412 and determine (process block 320) that the four entries 402 are not categorized. For example, the "Billy Smith" entry 402A includes two words; the "123 Jackson Street" entry 402C includes three words; and the "Bastrop, Texas" entry 402 includes two words. Upon receiving the table, the computing system 90 may omit special characters (e.g., symbols and punctuation marks) in performing the process 300.

The computing system 90 may determine (process block 330) whether each word in the uncategorized string(s) corresponds to an entry in a scoring table 420. In some implementations, the scoring table 420 may include a list of common words. For example, the computing system 90 may generate a list of common words based on historical data indicative of prior entries in data stores. In some implementations, the scoring table 420 may correspond to a region of the world (e.g., North America, the United States, Asia, and/or Latin America), such that the uncategorized entries in the data store may be assigned a corresponding scoring table based on metadata associated with the entry. Alternatively or additionally, a singular scoring table 420 may be employed. In the illustrated example, the computing system 90 may determine that the scoring table 420 includes the words "123" (or any string of numbers), "Bastrop," and "Street," and corresponding probability values for a plurality of categories 410. In this example, the categories 410 include a first category 410A indicative of a name (e.g., first and/or last), a second category 410B indicative of street address, and a third category 410C indicative of city. It should be understood that the scoring table may include any additional or alternative categories 410 and corresponding probability values.

In response to determining (process block 330) whether each word in the string corresponds to an entry in a scoring table, the computing system 90 may determine (process block 340) a probability that each word in the string corresponds to one or more categories. In this example, the computing system 90 may determine that the word "street" has a high probability (e.g., 99 out of 100) that the corresponding string identifies a street address. After determining (process block 340) the probability of each word in a string of alphanumeric characters, the computing system 90 may aggregate (process block 350) the probabilities for each of the words in a string of alphanumeric characters. For example, the computing system 90 may aggregate the probabilities for each of the three words in the "123 Jackson Street" entry 402B to determine that the entry 402 has a highest probability of corresponding to the second category 410B indicative of a street address. In this manner, process 300 may distinguish common words (e.g., phone) from other words that may include typos (e.g., phony). After the computing system 90 determines the category 410 of the uncategorized entry, the computing system 90 may assign (process block 360) the category 410 to the string. The computing system 90 may index (process block 370) the string using the scan index, discussed below, based on the category of the string. In this manner, otherwise unidentified columns (e.g., string of alphanumeric characters) in a data store (e.g., a data store maintained via SAS® software) may be identified based on the category to which they belong by executing computationally inexpensive operations, such as referencing each word in the string to the scoring table 420.

In some implementations, the process 300 may be employed to categorize various columns of one or more tables. For example, for each "subject" table being scanned, as set forth in process 300, for SDM and possible inclusion in scan and for each row of the table, each column may be scored separately, incrementing column-level counts. For each eligible PII and PCI finding type (e.g., Name, Address, City, Phone, E-mail, DOB, SSN, Member number, and so forth), binary numeric columns may be scored once (e.g., since they may be atomic) and each word of each character column is separately scored, such that the scores are added at the column level. After the scoring for the table is complete and for each column of the table, process 300 draws yes/no conclusions based on totals and percentages for each eligible PII and PCI finding type. As such, the computing system 90 may generate a list of table columns that contain names, a list of the tables that contain addresses, and so forth. A table column may be included in more than one list. The generated list of tables may be used to update GBLX indices after filtering out false positives. Scan indices may use process 300 as a guide to know what to index and what not to index. The computing system 90 implementing process 300 may specify aspects associated with the table-column-type level, and the scan described below may map individual values to individual rows.

Scan Index

Implementations of the present disclosure include assigning a category, such as a category defining an entry as including a phone number, dates of birth, member numbers, party surrogate key (e.g., any index associated with a customer or account number satisfying parameters to locate data in cases where a requested person has such an identifying number), social security numbers (SSNs), and PCI. These categories may be applied whether the original data is binary numeric, character digits, or formatted characters. SDM enforcement and privacy compliance may rely on PII detection distinguishing dates of birth from other dates, like transaction dates, and cannot depend on the column name. A user may import to SAS® software a date of birth from an input source as 6 or 8 digits (MMDDYY, DDMMYY, or YYMMDD) with 2- or 4-digit years with or without punctuation. Existing techniques may not be able to distinguish dates from timestamps, so all dates may be imported as timestamps. Thus, a column that includes timestamps that represent times at midnight are typically treated as if it were dates, which may be dates of birth. Many data stores render unknown dates as dates in the years 1800, 1801, or 9999. PII detection may exclude these dates. Users may copy dates and timestamps to numeric columns that do not have SAS formats that identify them as dates or timestamps, so they appear as bare numbers (e.g., uncategorized entries) of days or seconds since Jan. 1, 1960.

As discussed above, existing indices for SAS® software are large (e.g., about 22 bytes per index), computationally expensive, and are associated to entire tables, thereby making existing indices inefficient for identifying specific rows containing a specific entry or type of entry within a data store. Accordingly, there is a need to improve data management operations. By employing the embodiments disclosed herein, developers having access to the computing system 90 (FIGS. 1-2) may build a scan index of column-level findings, which may be filtered to remove false positives and facilitate searches in compliance with a policy 205 (FIG. 1). The computing system 90 may store and maintain, for example, over 700 SAS® software libraries, with more than 875,000 tables and more than 104 million columns, for example. Parsing through this data to identify certain entries is computationally expensive absent a global scan index. However, certain existing indices may be larger (e.g., in terms of bytes) than the tables it indexes and may not provide information regarding the row or table including a target entry. To improve computation, the scan index is small and referenced using binary numbers. Binary integers may be the smallest way to store values.

The scan index disclosed herein may include at least one of six different indices: MEMBNR (member number), DOB (date of birth), PHONE, EMAIL NAME, ADDR (street address words), and CITY (city) indices. These indices may correspond to each of the categories 410 (FIG. 4). For example, indexing (process block 370) the string using the scan index, as discussed below, based on the category of the string, may include assigning the entry one of the six indices (e.g., MEMBNR (member number), DOB (date of birth), PHONE (phone), EMAIL NAME (E-mail), ADDR (street address words), and CITY (city)). The index generation for NAME, ADDR, and CITY may be applied to columns having 32 characters or less, or any suitable (e.g., greater or lesser) character limit. The computing system 90 may index columns that are suspected to include a name, a street address, or a city. While the scan index disclosed herein is discussed in the context of six different indices, it should be understood that the scan index may include any suitable number of indices (e.g., additional or alternative indices to those discussed herein).

Figure 5:
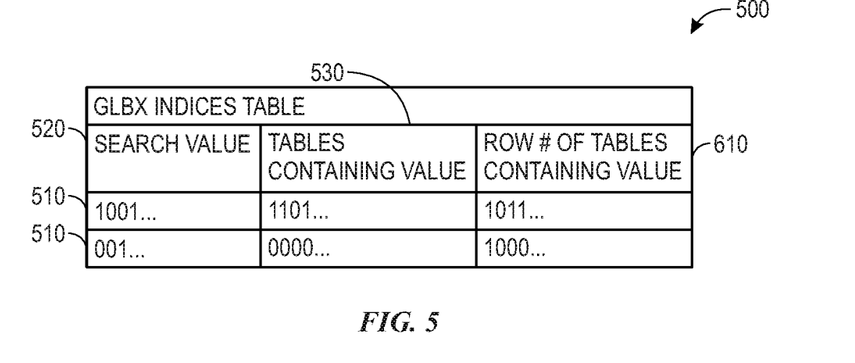
FIG. 5 is an example of a scan indices table, according to implementations of the present disclosure.

FIG. 5 is an example of a scan indices table 500, according to implementations of the present disclosure. The scan indices table 500 may include one or more scan indices 510 having information in three columns. The first column may include a first indication 520 of a search value (e.g., corresponding to an entry being searched). In certain implementations, the first indication 520 may include a condensed form of the indexed value unique for each key and may not be reversible. For numeric values (MEMBNR, PHONE, and DOB), the first column may include a binary integer representation of the number. For character values, the first column may include a native value of 16 or fewer characters, otherwise, the first column may include its MD5 checksum. As used herein, "MD5" may refer to a standard 128-bit encoding of any string of alphanumeric characters that is not reversible but may be unique. However, it should be understood that other checksums may be employed. For example, the first column may include a native value of 20 or fewer characters, otherwise, the first column may include its SHA1 checksum. Since SAS® software typically stores fixed-length characters, these checksums may provide adequate length for the majority of name-words. Moreover, these checksums may be more practical for implementations employed using SAS® software because other storage formats that do not support variable-length characters may store null-terminated strings.

The second column may include a second indication 530 of the table that includes the target entry. In certain implementations, the second indication 530 may include surrogate key (hereinafter referred to as "scan number") representing the table and/or an operation used to detect the target entry (e.g., categorized as PII). In certain implementations, a new scan number is assigned (e.g., to replace an old scan number), in response to the table changing (e.g., in response to an entry being added or deleted). The surrogate key of the second column may be rendered as a 3-byte binary integer, which may hold up to 16 million values.

The third column may include an indication of the row number in the table. The third column may include an indication of the row number rendered as a 5-byte unsinged integer, which may hold over a trillion distinct values. In certain implementations, to save space, the scan member number index may employ other forms that adequately represent any reasonable number row, yet free storage bits for other suitable purposes.

As discussed above, the scan index 510 may include at least one of six different indices: MEMBNR ("member-number"), DOB ("date of birth"), PHONE ("phone number"), EMAIL ("E-mail"), NAME ("name"), ADDR ("street address"), and CITY indices. The member number index may identify table rows keyed by member number, account number, social security number ("SSN"), and/or any suitable index associated with a customer or account number satisfying parameters to locate data in cases where a requested person has such an identifying number. The member number part of the index is larger than the part of the index for the other indices (e.g., date of birth, phone number, E-mail, name, street address, and city indices). In some contexts, the computing system 90 may include more data corresponding to customers than non-customers, such that a processing a request or query using the scan member number indices may improve searches.

The computing system 90 may receive an input referencing a member number and identify entries by matching the member number or any other index (e.g., an index associated with a customer or account number satisfying the parameters to locate data in cases where a requested person has such an identifying number), instead of by matching name, address, or date of birth. As such, in some implementations, the scan member number is stored using about 27 bits, which can store member numbers up to up to 134 million. Storing a member number as a 4-byte (32-bit) value leaves 5 unused bits, which may serve as an overflow area for the 4-byte value used to store the row number. These 37 bits may support row numbers up to 137 billion rows. It should be appreciated that additional rows may be supported by enlarging the index.

In some implementations, the member-number indices may be stored in one table or in a plurality of tables. For example, the member-number indices may be stored in 256 tables (e.g., of equal size), according the value of the least significant byte (8 bits) of the member number as binary integer. To facilitate referencing these tables, the plurality of tables may be named "SCAN_MEMBNR_XX," where XX represents all possible 2-hexadecimal-digit numbers, 00 to FF. Since the table name may include this least-significant byte, in some implementations, the name of the table is not stored within the table, thereby saving space. Benefits of partitioning the index in such a manner include rapidly updating the indices. For example, a partitioned index may be updated in parallel, while SAS® software may be typically limited adding rows to a single, large sorted table as a single-thread process. Other types of storage schemes may not have this constraint.

In some implementations, the plurality of index table storing the member number indices may include the following 3 columns having about 10 bytes per row. The first column of the rows may include a 3-byte binary integer with the high 19-bits of member number and the high 5-bits of row, rendered such that rows for a member sort together. The second column of the rows may include a 3-byte integer rendition, as described above. The third column of the rows may include a 4-byte binary integer, which may include the low 32-bits of the 37-bit row number. In certain implementations, the computing system 90 may store integers in little-endian form (e.g., from the most-significant byte to the last-significant byte). The rows that represent the same member may differ in the last byte because the entries of the first column may be stored as a character value. Accordingly, in response to the computing system 90 receiving a query referencing a particular entry of the first column, the 5-bits may be ignored to compare an index row with the entry sought by the query.

In certain implementations, the member number indices may store 40 billion index entries in about 371 GB. Also, because the member number indices may be divided into a plurality of tables (e.g., into 256 equal-sized pieces), the computing system 90 may update the plurality of tables in parallel. For example, the computing system 90 may update the member number indices by running 4 batches of 64 parallel update tasks (e.g., in about 5 minutes).

Turning to the other indices of the scan indices 510, in certain implementations, the DOB ("date of birth"), PHONE ("phone number"), EMAIL ("E-mail"), NAME ("name"), ADDR ("street address"), and CITY indices may be identical, with the exception of the first column. The DOB, PHONE, EMAIL, NAME, ADDR, and CITY DOB ("date of birth"), PHONE ("phone number"), EMAIL ("E-mail"), NAME ("name"), ADDR ("street address"), and CITY indices may be sorted by their 3 columns, the first column according to the table 1 below, the second column as described above, and the third column, as a 5-byte integer with the row number.

TABLE 1

First Column of DOB, PHONE, EMAIL, NAME, ADDR, and CITY indices

| Index | 1st column indication | Length (byte) | Contents |
| --- | --- | --- | --- |
| DOB | DOB_IB2 | 2 | Signed integer of the date of birth as a date (e.g., date), storing dates in any year between 1880 and 2048. |
| PHONE | Phone4 | 4 | Unsigned integer of the 7-digit phone number or a 10-digit number that stores a surrogate key of the Area code as the first 3 digits. |
| EMAIL | EMAIL_MD5 | 16 | MD5(UPCASE(TRIM(EMAIL))). MD5 fits in 16 bytes, UPCASE because E-mail addresses may be case-insensitive, and TRIM to avoid trailing blanks from influencing MD5. |
| NAME | CHAR16 | 16 | Single word from a column with NAME findings, if word includes alphabetics, hyphens, and periods. MD5( ) if longer than 16. |
| ADDR | CHAR16 | 16 | Single word (after applying char and freeform word cleanup) from a column with ADDR findings, MD5( ) if longer than 16. |
| CITY | CHAR16 | 16 | Entire column if it has no digits, MD5( ) if > than 16. |

In certain implementations, the scan indices may be stored in less than 20 bytes. For example, as described in table 1, the date of birth may be stored as a 2-byte signed binary integer. The computing system 90 may store any possible 10-digit number in 34 bits, but a 4-byte (32-bit) value may store 10-digit numbers up to 428-999-9999. In the context of an enterprise having mostly customers in the United States, the computing system 90 may store US phone numbers in a 4-byte integer. For example, the United States may have about 345 active US area codes, such that a surrogate value in the range 1-428 may be employed to capture phone numbers within the United States within a 32-bit value. It should be understood that the computing system 90 may employ a 5-byte value to store additional phone numbers from other regions of the world.

The Computing System Executing a Data Management Operation

Figure 6:
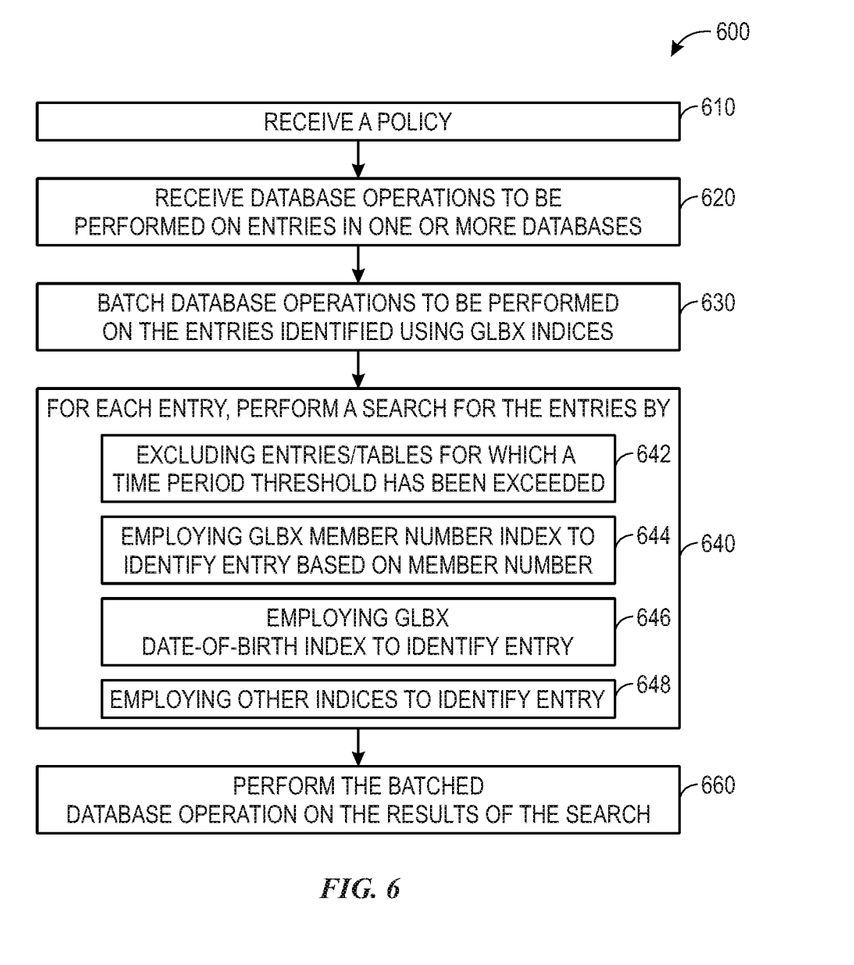
FIG. 6 is a flow diagram of a process for performing a data management operation on target data of the computing system of FIG. 1, according to implementations of the present disclosure.

FIG. 6 is a flow diagram of a process 600 for performing a data management operation on target data of the computing system 90 of FIG. 1, according to implementations of the present disclosure. The process 600 may be performed by the computing system 90 of FIG. 1. For example, the process 600 may be implemented in the form of a software application that includes instructions executed by suitable processing circuitry of the computing system 90, such as the processing circuitry 204 (FIGS. 1 and 2). At least some of the steps of the process 600 may be executed by employing AI and/or machine learning methodologies. The illustrated process 600 is provided as an example, and in other embodiments, certain illustrated steps of the process 600 may be performed in other orders, skipped, or repeated, in accordance with the present disclosure.

The process 600 may include receiving (process block 610) a policy 205 (FIGS. 1 and 2) (e.g., guidelines), which may include a set of external (e.g., local, state, or national) or internal (e.g., enterprise-wise, department wide, or technology group-wide) rules, regulations, and/or guidelines defining procedures for maintaining information (e.g., customer data) in the computing system 90. The computing system 90 may receive (process block 610) the policy as a set of rules for managing data. In certain implementations, the policy 205 may include a set of rules provided as code or instructions stored in the memory device 202 and interpretable by processing circuitry 204 to cause the processing circuitry 204 to maintain (e.g., add, modify, delete) data received from the nodes/devices 101. For example, as mentioned above, logic defining the rules associated with the California Consumer Privacy Act is one example of a policy 205 (e.g., external policy) defining rules for how certain enterprises may handle personal customer data. In another example, an enterprise may define internal guidelines for removing outdated data to reduce storage and improve computation speed on the data. As another example, the computing system 90 may receive a policy indicating that after a certain date (e.g., Jun. 1, 2020), PII is to be deleted after the PII is used (e.g., to process a claim or transaction). It should be understood, that the computing system 90 may receive any suitable policy 205 to maintain data in accordance with the policy.

The process 600 may include receiving (process block 620) a data management operation to be performed on entries in one or more data stores, for example, stored in memory device 202 (FIGS. 1 and 2) or storage system 206 (FIGS. 1 and 2). The data management operation may include deleting certain entries (e.g., entries being indexed as set forth above, entries corresponding to a certain category as set forth above, and so forth), adding information to certain entries, replacing certain entries with null values, and so forth. The computing system 90 may receive a request to perform the operation across one or more data stores on entries distributed across a plurality of tables. The computing system 90 may receive (process block 620) the data management operation via a manual user input, an automatically generated command (e.g., generated in response to a trigger event), and/or a command generated using machine learning or AI methodologies.

In certain implementations, the databases may include any suitable type of data store or table, such as relational database clusters (e.g., a Structured Query Language (SQL) database) that use a tabular format of rows and columns, or non-relational database clusters (e.g., a non-Structured Query Language (NoSQL) database) that do not use a tabular format of rows and columns and instead use a storage model that may be configured for the specific configurations of the type of data being stored. For example, the data may be stored as simple key/value pairs, as JavaScript Object Notation (JSON) documents, or as a graph consisting of edges and vertices. The databases may also be distributed, open-sourced, and/or horizontally scalable. In certain implementations, the computing system 90 may be based on or maintain one or more databased using the SAS® software platform, and/or the databases include SAS® software clusters. In certain implementations, the selected storage model may rapidly locate any index entry that applies to a requested name, address, email, and so forth.

The process 600 may include batching (process block 630) the data management operation to be performed on the entries. The computing system 90 may batch (process block 630) the data management operations, such that the data management operations are initiated at a certain time based on timing factors. For example, the data management operations may be initiated based on any suitable timing factors, such as a pre-defined schedule (e.g., daily, weekly, or any other suitable period or length of time). In certain implementations, batching (process block 620) the data management operations may include caching the data management operations until a trigger event is detected. The trigger event may include a time threshold expiring, a time interval expiration indication, a user input indicative of a request to initiate the cached data management operations. By batching (process block 620) the data management operations, the computing system 90 may improve the speed of running searches by initiating and executing the batched data management operations simultaneously, thereby reducing the number of times the computing system 90 performs a query for the entries associated with the data management operation. Instead of accessing the one or more data stores in response to receiving each data management operation, by accessing the one or more data stores based on the batching approach disclosed herein, the computational resources associated with accessing the one or more databases may be reduced, thereby improving queries and data management operations.

While batching may reduce the number of times a subject table is read in its entirety to determine whether requested data is in the table, not all search results based on the index may be conclusive. In some contexts, an unbatched solution may improve a search query by searching each table separately for requests to achieve a more accurate and/or precise search. For example, in the following two examples, tables may be searched in their entirety. First, the physical organization of the table may benefit from sequential reading (e.g., such as a self-expanding zip file). Second, a table that does not index long character columns may rely on full-table scans to determine whether the requested data is in long, unindexed columns.

The computing system 90 may identify the entries associated with the data management operation by employing the scan indices. To that end, process 600 may include performing (process block 640) a search query for the entries associated with the batched data management operations. The computing system 90 may perform a near real time search, because there may be a slight latency from the time a software application is accessed until the time the access is logged and indexed in the database and thus becomes searchable. Responsive to a request to perform three data management operations on entries belonging to a first category, a second category, and a third category, respectively, the computing system 90 may perform (process block 640) a search query to identify the entries belonging to a first category, a second category, and a third category.

The policy 205 may define a time period for performing the data management operations. In certain implementations, the policy 205 may indicate that the data management operations discussed above are to be performed for data received or accessed after a particular instance in time or data being received after an instance or threshold of time. For example, the policy 205 may indicate that the operations are to be performed on data received after Jan. 1, 2020. Performing (process block 640) the search query for the entries associated with the batched data management operations may include, first, excluding (process block 642) tables or entries not satisfying the time period for performing the data management operations set forth in the policy 205.

Continuing the example above, the computing system may ignore entries or tables received prior to Jan. 1, 2020. By excluding (process block 642) tables and/or entries not satisfying time factors of the policy 205, the computing system 90 may narrow the search by avoiding searching for an entry in tables not comporting with time factors of the policy 205.

To further narrow a search, process 600 may include performing (process block 640) the search query for the entries associated with the batched data management operations by employing (process block 644) the scan member number index described above. In certain implementations, the computing system 90 may receive (process block 620) a request to perform a data management operation on certain entries associated with an existing member account, as referenced by the member number. The computing system 90 may employ (process block 644) the scan member number indices to identify tables having member numbers. In certain implementations, the computing system 90 may identify tables having member numbers by identifying tables having more than a certain percent threshold number of entries with a member number. The computing system 90 may exclude tables having entries not associated with a member number in response to receiving a request to perform a data management operation on entries associated with an existing member account. In this manner, the computing system 90 may narrow the search by avoiding searching for an entry in tables not having member numbers when the request includes performing a data management operation on entries having a certain member number(s).

To further narrow a search, process 600 may include performing (process block 640) the search query for the entries associated with the batched data management operations by employing (process block 646) the scan date of birth (DOB) index described above. In certain implementations, the computing system 90 may receive (process block 620) a request to perform a data management operation on certain entries for users having a specific date of birth. The computing system 90 may employ (process block 646) the scan date of birth indices to identify tables having date of birth information (e.g., information indexed using the scan date of birth indices, as described above). In certain implementations, the computing system 90 may identify tables having date of birth information by identifying tables having more than a certain percent threshold number of entries with date of birth information. The computing system 90 may exclude tables having entries not associated with a date of birth in response to receiving a request to perform a data management operation on entries associated with a particular date of birth. In this manner, the computing system 90 may narrow the search by avoiding searching for an entry in tables not having date of birth information when the request includes performing a data management operation on entries of users having a particular date of birth.

While process blocks 642, 644, and 646 describe a few potential scan indices that may be used to perform (process block 640) or further narrow a search, in certain implementations, alternative or additional scan indices may be employed (process block 648). In certain implementations and as set forth above, the name scan indices, the scan address indices, the scan city indices, the scan date of birth indices, the scan E-mail indices, or any combination thereof may be employed. In a first example, the computing system 90 may employ (process block 648) the scan name indices, the scan address indices, and/or the scan city indices to perform (process block 640) the search. In a second example, the computing system 90 may employ (process block 648) the scan name indices and the scan date of birth indices to perform (process block 640) the search. In a third example, the computing system 90 may employ (process block 648) the scan name indices and the scan phone indices to perform (process block 640) the search. In a fourth example, the computing system 90 may employ (process block 648) the scan name indices and the scan E-mail indices to perform (process block 640) the search.

After performing (process block 640), the computing system 90 may develop a table that includes the requested entries. The table may include a superset of table row combinations that include the requested entries. After identifying (process block 640) the entries on which the data management operation is requested to be performed, the computing system 90 may perform (process block 660) the batched data management operations, as described above, on the results of the performed search.

Figure 7:
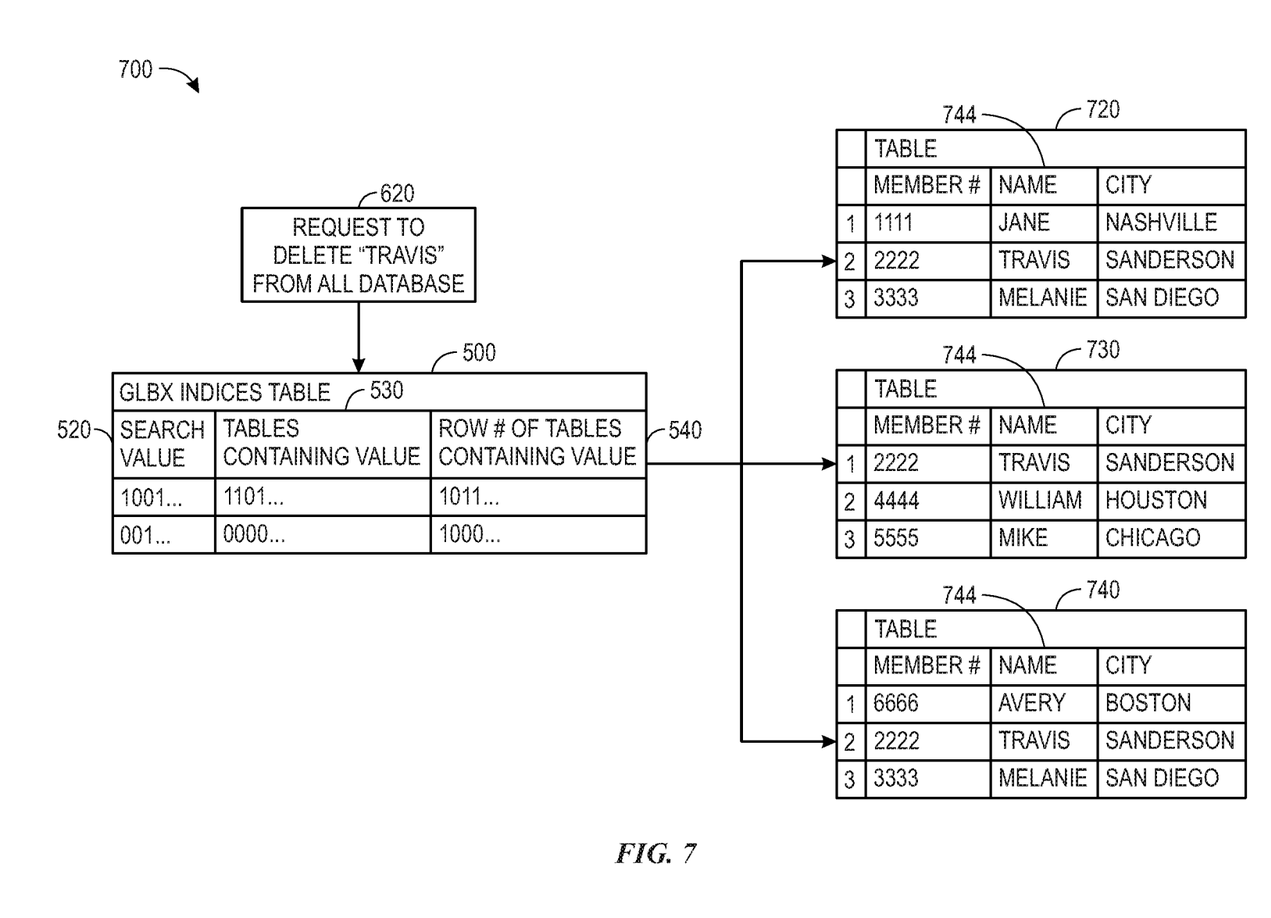
FIG. 7 is a flow diagram of a process for performing batched data management operations based on the process of FIG. 6, according to implementations of the present disclosure.

FIG. 7 is a flow diagram of a process 700 for performing batched data management operations based on the process 600 of FIG. 6, according to implementations of the present disclosure. In the illustrated example, the computing system 90 (FIGS. 1 and 2) may receive (process block 620 of FIG. 6) a request to remove entries having the first name "TRAVIS" from data stores accessible by the computing system 90. By employing the scan name indices defined in the scan indices table 500, as described above with respect to FIGS. 5 and 6, the computing system 90 may determine that tables 720, 730, and 740 include entries having the target name, "TRAVIS," (e.g., in column 744), as indexed using the scan name indices. The computing system 90 may determine that the tables 720, 730, and 740 include the name "TRAVIS" in rows 2, 1, and 2, respectively. In certain implementations, the computing system 90 may generate a table that includes the requested entries. The table may include superset of table row combinations that include the requested entries. The computing system 90 may then perform the requested data management operation (e.g., removing the identified entries having "TRAVIS" as a name).

While the example illustrated in FIG. 7 includes processing a request to remove a particular first name, it should be understood that the request may alternatively include a more detailed request, such as to remove all entries having a PII that have been received after Jan. 1, 2020. The computing system 90 may handle multiple requests by batching the requests as described above.

Technical effects of the present disclosure include systems, devices, methods, and computer-readable media for performing various actions for bringing data stores into compliance with a policy. Technical effects of the present disclosure include a technique for determining that a string of alpha-numeric characters (e.g., text) is uncategorized and matching each word in the string to a corresponding entry in a scoring table defining a probability that a word belongs to one or more categories. Technical effects of the present disclosure include aggregating the probabilities for each word in the string to determine a category of the string. In this manner, unidentified and uncategorized data may be categorized to facilitate maintenance of data in and across large data stores. Additional technical effects of the present disclosure include generating a global scan index (hereinafter referred to as "scan index") for Statistical Analysis System (SAS®) software. Additional technical effects of the present disclosure include batching requests to perform a certain data management operation on data of a certain category and employing the scan indices in SAS® software to identify the data of the certain category. Batching the requests may increase the speed of executing the data management operations by searching the existing tables at the same time to accommodate multiple requests.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
one or more hardware processors; and
non-transitory memory storing instructions that, when executed by the one or more hardware processors, cause the one or more hardware processors to perform actions comprising:
receiving a policy defining maintenance rules of data in a data store, wherein the policy comprises a string of alphanumeric characters and an additional string of alphanumeric characters to be adjusted, wherein the string of alphanumeric characters is different than the additional string of alphanumeric characters;
retrieving a global index in response to receiving the policy and based on the global index comprising the string of alphanumeric characters, wherein the global index indicates, in the data store, a row of a table containing the string of alphanumeric characters;
retrieving an additional global index in response to receiving the policy and based on the additional global index comprising the additional string of alphanumeric characters, wherein the additional global index indicates, in the data store, an additional row of the table containing the additional string of alphanumeric characters;
batching operations via, at a particular time, initiating and performing a search query on the table by scanning the row of the table for the string of alphanumeric characters according to the global index and scanning the additional row of the table for the additional string of alphanumeric characters according to the additional global index to identify a table entry containing the string of alphanumeric characters based on the row of the table indicated by the global index and to identify an additional table entry based on the additional row of the additional table indicated by the additional global index; and
adjusting the table entry and the additional table entry in accordance with the policy after identification of the table entry and the additional table entry by performing the search query.

2. The system of claim 1, wherein the actions comprise:
performing an additional search query on an additional table to identify another table entry containing the string of alphanumeric characters based on a respective row of the additional table indicated by the global index and another additional table entry containing the additional string of alphanumeric characters based on a respective additional row of the additional table indicated by the additional global index; and
adjusting the another table entry and the another additional table entry in accordance with the policy after identification of the another table entry and the another additional table entry by performing the additional search query.

3. The system of claim 1, wherein the actions comprise:
excluding one or more tables from the data store based on the one or more tables being received at a respective date that is outside of a period of time defined by the policy; and
from remaining tables of the data store, identifying a subset of tables comprising table entries associated with a member number.

4. The system of claim 3, wherein the actions comprise performing the search query on the table based on the table being a part of the subset of tables.

5. The system of claim 1, wherein the actions comprise:
receiving a string of uncategorized alphanumeric characters;
determining whether each word in the string of uncategorized alphanumeric characters corresponds to an entry in a scoring table;
determining a category associated with each word in the string of uncategorized alphanumeric characters based on whether each word in the string of uncategorized alphanumeric characters corresponds to the entry in the scoring table;
assigning an overall category to the string of uncategorized alphanumeric characters based on the category associated with each word in the string of uncategorized alphanumeric characters; and
indexing the string of uncategorized alphanumeric characters based on the overall category.

6. The system of claim 5, wherein the actions comprise creating the global index comprising the string of alphanumeric characters based on indexing of the string of uncategorized alphanumeric characters.

7. The system of claim 5, wherein the overall category comprises an indication of a member number, a date of birth, an E-mail, a first name, a last name, an address, or a city.

8. The system of claim 1, wherein the global index is stored in less than 20 bytes.

9. The system of claim 1, wherein performing the search query comprises:
accessing a plurality of tables of the data store based on a batching schedule, wherein the plurality of tables comprises the table indicated by the global index and the additional global index;
searching the plurality of tables based on the global index and the additional global index to find a plurality of table entries containing the string of alphanumeric characters and the additional string of alphanumeric characters, wherein the plurality of table entries comprises the table entry and the additional table entry; and
generating a new table of the plurality of table entries.

10. The system of claim 1, wherein the global index comprises an entry comprising the string of alphanumeric characters, and the entry comprises:
a first indication of a member number;
a second indication of a date of birth;
a third indication of an E-mail;
a fourth indication of a name;
a fifth indication of an address;
a sixth indication of a city; or
any combination thereof.

11. The system of claim 1, wherein the policy corresponds to a state level regulation, a national regulation, an enterprise-wide guideline, or any combination thereof.

12. The system of claim 1, wherein the global index comprises an entry comprising binary integers representative of the string of alphanumeric characters.

13. A computer-implemented method for performing batched data management operations, the computer-implemented method comprising:
receiving a policy defining maintenance rules of data in a data store, wherein the policy comprises a request to adjust requested table entries that each comprise a string of alphanumeric characters of a plurality of strings of alphanumeric characters or an additional string of alphanumeric characters of the plurality of strings of alphanumeric characters, wherein the string of alphanumeric characters is different than the additional string of alphanumeric characters;
retrieving a global index of a plurality of global indices in response to receiving the policy and based on the global index of the plurality of global indices comprising the string of alphanumeric characters of the plurality of strings of alphanumeric characters, wherein the global index of the plurality of global indices indicates, in the data store, a plurality of rows of a plurality of tables containing the string of alphanumeric characters, wherein the plurality of rows of the plurality of tables comprises a respective row of a table of the plurality of tables;
retrieving an additional global index of the plurality of global indices in response to receiving the policy and based on the additional global index of the plurality of global indices comprising the additional string of alphanumeric characters of the plurality of strings of alphanumeric characters, wherein the additional global index of the plurality of global indices indicates, in the data store, a plurality of additional rows of the plurality of tables containing the additional string of alphanumeric characters, wherein the plurality of additional rows of the plurality of tables comprises a respective additional row of the table of the plurality of tables;
batching operations via:
at a particular time, initiating and performing a search query on the table of the plurality of tables to identify a table entry containing the string of alphanumeric characters and to identify an additional table entry containing the additional string of alphanumeric characters by scanning the respective row of the table of the plurality of tables indicated by the global index of the plurality of global indices and scanning the respective additional row of the table of the plurality of tables indicated by the additional global index of the plurality of global indices; and
adjusting the table entry and the additional table entry in accordance with the policy after identification of the table entry and the additional table entry by performing the search query.

14. The computer-implemented method of claim 13, comprising:
identifying one or more tables received at a respective date that is outside of a period of time defined by the policy;
from remaining tables of the data store, identifying a subset of tables from the data store comprising an additional plurality of table entries associated with a member number; and
performing the search query on the plurality of tables based on the plurality of tables being a part of the subset of tables.

15. A non-transitory, computer-readable medium having computer-readable code stored thereon that, when executed by one or more processors, causes the one or more processors to perform operations comprising:
receiving a policy defining maintenance rules of data in a data store, wherein the policy indicates an adjustment to requested table entries that each comprise a string of alphanumeric characters of a plurality of strings of alphanumeric characters or an additional string of alphanumeric characters of the plurality of strings of alphanumeric characters, wherein the string of alphanumeric characters is different than the additional string of alphanumeric characters;
retrieving a global index of a plurality of global indices in response to receiving the policy and based on the global index of the plurality of global indices comprising the string of alphanumeric characters of the plurality of strings of alphanumeric characters, wherein the global index of the plurality of global indices indicates, in the data store, a plurality of rows of a plurality of tables containing the plurality of strings of alphanumeric characters, wherein the plurality of rows of the plurality of tables comprises a respective row of a table of the plurality of tables;
retrieving an additional global index of the plurality of global indices in response to receiving the policy and based on the additional global index of the plurality of global indices comprising the additional string of alphanumeric characters of the plurality of strings of alphanumeric characters, wherein the additional global index of the plurality of global indices indicates, in the data store, a plurality of additional rows of the plurality of tables containing the additional string of alphanumeric characters, wherein the plurality of additional rows of the plurality of tables comprises a respective additional row of the table of the plurality of tables;

batching operations via:

at a particular time, initiating and performing a search query on the table of the plurality of tables to identify a table entry containing the string of alphanumeric characters and to identify an additional table entry containing the additional string of alphanumeric characters by scanning the respective row of the table of the plurality of tables indicated by the global index of the plurality of global indices and scanning the respective additional row of the table of the plurality of tables indicated by the additional global index of the plurality of global indices; and adjusting the table entry and the additional table entry in accordance with the policy after identification of the table entry and the additional table entry by performing the search query.

16. The non-transitory, computer-readable medium of claim 15, wherein the operations comprise:

excluding one or more tables from the data store based on the one or more tables being received at a date that is outside of a period of time defined by the policy; and from remaining tables of the data stores, identifying a first subset of tables comprising an additional plurality of table entries associated with a member number.

17. The non-transitory, computer-readable medium of claim 16, wherein the operations comprise:

from the first subset of tables, identifying a second subset of tables comprising a respective plurality of additional table entries associated with a date-of-birth; and performing the search query on the plurality of tables based on the plurality of tables being a part of the second subset of tables.

18. The non-transitory, computer-readable medium of claim 17, wherein the operations comprise, from the first subset of tables, identifying the second subset of tables based on a respective quantity of the respective plurality of additional table entries of each table of the second subset of tables exceeding a threshold quantity.

19. The non-transitory, computer-readable medium of claim 15, wherein performing the search query comprises:

accessing the plurality of tables of the data store;

performing the search query on the plurality of tables by scanning the plurality of rows of the plurality of tables indicated by the plurality of global indices to find a plurality of table entries including the table entry; and generating a new table of the plurality of table entries.

\* \* \* \* \*